(12) United States Patent
Kozak et al.

(10) Patent No.: US 6,629,034 B1
(45) Date of Patent: Sep. 30, 2003

(54) DRIVING PROFILE METHOD AND SYSTEM

(75) Inventors: Frank Kozak, Naperville, IL (US); Mark Barton, Schaumburg, IL (US)

(73) Assignee: Navigation Technologies Corp., Chicago, IL (US)

( * ) Notice: Subject to any disclaimer, the term of this patent is extended or adjusted under 35 U.S.C. 154(b) by 86 days.

(21) Appl. No.: 09/875,402

(22) Filed: Jun. 6, 2001

(51) Int. Cl.⁷ ................................................. G01C 21/34
(52) U.S. Cl. ........................ 701/200; 701/204; 701/209; 73/178 R; 340/994
(58) Field of Search .................. 701/200, 204, 701/209; 340/994; 73/178 R

(56) References Cited

U.S. PATENT DOCUMENTS

| | | | | |
|---|---|---|---|---|
| 4,361,202 A | * | 11/1982 | Minovitch | 104/88.02 |
| 5,021,953 A | * | 6/1991 | Webber et al. | 705/6 |
| 5,031,104 A | * | 7/1991 | Ikeda et al. | 340/990 |
| 5,184,303 A | * | 2/1993 | Link | 340/995 |
| 5,290,976 A | * | 3/1994 | Bahjat et al. | 187/293 |
| 5,331,546 A | * | 7/1994 | Webber et al. | 705/6 |
| 5,450,343 A | * | 9/1995 | Yurimoto et al. | 340/990 |
| 5,648,768 A | * | 7/1997 | Bouve | 340/905 |
| 5,724,316 A | * | 3/1998 | Brunts | 340/988 |
| 5,808,565 A | * | 9/1998 | Matta et al. | 340/988 |
| 5,845,227 A | * | 12/1998 | Peterson | 340/905 |
| 5,948,040 A | * | 9/1999 | DeLorme et al. | 340/990 |
| 6,023,655 A | * | 2/2000 | Nomura | 340/990 |
| 6,073,075 A | * | 6/2000 | Kondou et al. | 340/988 |
| 6,076,114 A | * | 6/2000 | Wesley | 370/230 |
| 6,088,636 A | * | 7/2000 | Chigumira et al. | 701/214 |
| 6,119,095 A | * | 9/2000 | Morita | 705/5 |
| 6,144,901 A | * | 11/2000 | Nickles et al. | 701/19 |
| 6,144,916 A | | 11/2000 | Wood, Jr. et al. | 701/200 |
| 6,209,026 B1 | * | 3/2001 | Ran et al. | 702/3 |
| 6,253,150 B1 | * | 6/2001 | Nakamura | 180/170 |
| 6,256,577 B1 | * | 7/2001 | Graunke | 701/117 |
| 6,263,266 B1 | * | 7/2001 | Hawthorne | 246/1 R |
| 6,266,612 B1 | | 7/2001 | Dussell et al. | |
| 6,317,668 B1 | * | 11/2001 | Thibault | 701/200 |
| 6,317,686 B1 | * | 11/2001 | Ran | 701/117 |
| 6,317,720 B1 | * | 11/2001 | Murakami et al. | 705/10 |
| 6,333,703 B1 | * | 12/2001 | Alewine et al. | 340/905 |
| 6,351,698 B1 | * | 2/2002 | Kubota et al. | 340/988 |
| 6,356,836 B1 | * | 3/2002 | Adolph | 701/206 |
| 6,356,838 B1 | * | 3/2002 | Paul | 701/201 |
| 6,374,176 B1 | * | 4/2002 | Schmier et al. | 340/988 |
| 6,397,143 B1 | * | 5/2002 | Peschke | 701/201 |
| 6,401,029 B1 | * | 6/2002 | Kubota et al. | 701/201 |
| 6,405,257 B1 | * | 6/2002 | Gersht et al. | 709/232 |
| 6,408,307 B1 | * | 6/2002 | Semple et al. | 701/208 |
| 6,414,635 B1 | * | 7/2002 | Stewart et al. | 342/457 |
| 6,480,783 B1 | * | 11/2002 | Myr | 701/117 |
| 2002/0095249 A1 | | 7/2002 | Lang | 701/29 |

\* cited by examiner

*Primary Examiner*—William A. Cuchlinski, Jr.
*Assistant Examiner*—Olga Hernandez
(74) *Attorney, Agent, or Firm*—Jon D. Shutter; Frank J. Kozak; Lawrence M. Kaplan

(57) ABSTRACT

A navigation system includes a driving profile program. The driving profile program collects information about an end user's driving activity. The information relates to trips made by the end user. The information includes departure times, intermediate stops, arrival times, purposes of the trips, and so on. After collecting this information over a period of time, the driving profile program analyzes the end user's driving activity. The driving profile program provides the end user with a driving activity profile. In addition, the driving profile program determines ways to reduce the amount of time and/or expense that the end user spends traveling in his/her vehicle and suggests modifications to the end user's driving activity that would save the end user time or expense.

36 Claims, 3 Drawing Sheets

DRIVING PROFILE METHOD AND SYSTEM

BACKGROUND OF THE INVENTION

The present invention relates to a feature provided by a navigation system that reduces the amount of unnecessary travel by an end user thereby saving the end user time and expense.

Navigation systems are available that provide end users (such as drivers and passengers of the vehicles in which the in-vehicle navigation systems are installed) with various navigation-related features and functions. For example, some navigation systems are able to determine an optimum route to travel by roads between locations in a geographic region. Using input from the end user, and optionally from equipment that can determine the end user's physical location (such as a GPS system), a navigation system can examine various paths between two locations to determine an optimum (i.e., fastest) route to travel from a starting location to a destination location in the geographic region. After determining the optimum route to a destination, the navigation system may then provide the end user with information about the optimum route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on display screens outlining routes to destinations, the types of maneuvers to be taken at various locations along the routes, locations of certain types of features, and so on. With some navigation systems, traffic conditions are taken into account when determining optimum routes.

One of the benefits provided by navigation systems is that they save time for users. Navigation systems achieve this benefit in several ways. Navigation systems help users locate desired destinations quickly. Navigation systems also provide users with the fastest routes to desired destinations. Although navigation systems save time for people who use them, there continues to be room for improvements. For example, drivers still encounter traffic congestion and delays. Therefore, there continues to be a need to find ways to save time for users of navigation systems.

SUMMARY OF THE INVENTION

To address these and other objectives, the present invention comprises a driving profile program. The driving profile program collects information about an end user's driving activity. The information collected by the driving profile program relates to trips made by the end user. The information about trips includes the departure times, the stops along the way, the arrival times, and the purposes of the trips, as well as other types of information. After collecting this information over a period of time, such as one or more II months, the driving profile program analyzes the end user's driving activity. The driving profile program then provides the end user with a profile of his/her driving activity. In addition, based on the analysis of the end user's driving activity, the driving profile program identifies ways to reduce the amount of time and/or expense that the end user spends traveling in his/her vehicle. The driving profile program suggests modifications to the end user's driving activity that would save the end user time or expense.

In a further aspect, the driving profile program uses traffic information relating to routes along which the end user travels in order to suggest ways that the driver can reduce the amount of time spent traveling.

In another aspect, the driving profile program takes into account other end users' driving activities in order to suggest ways that a driver can reduce the amount of time or expense spent traveling.

DETAILED DESCRIPTION OF THE PRESENTLY PREFERRED EMBODIMENTS

I. Overview of Navigation System

Figure 1:
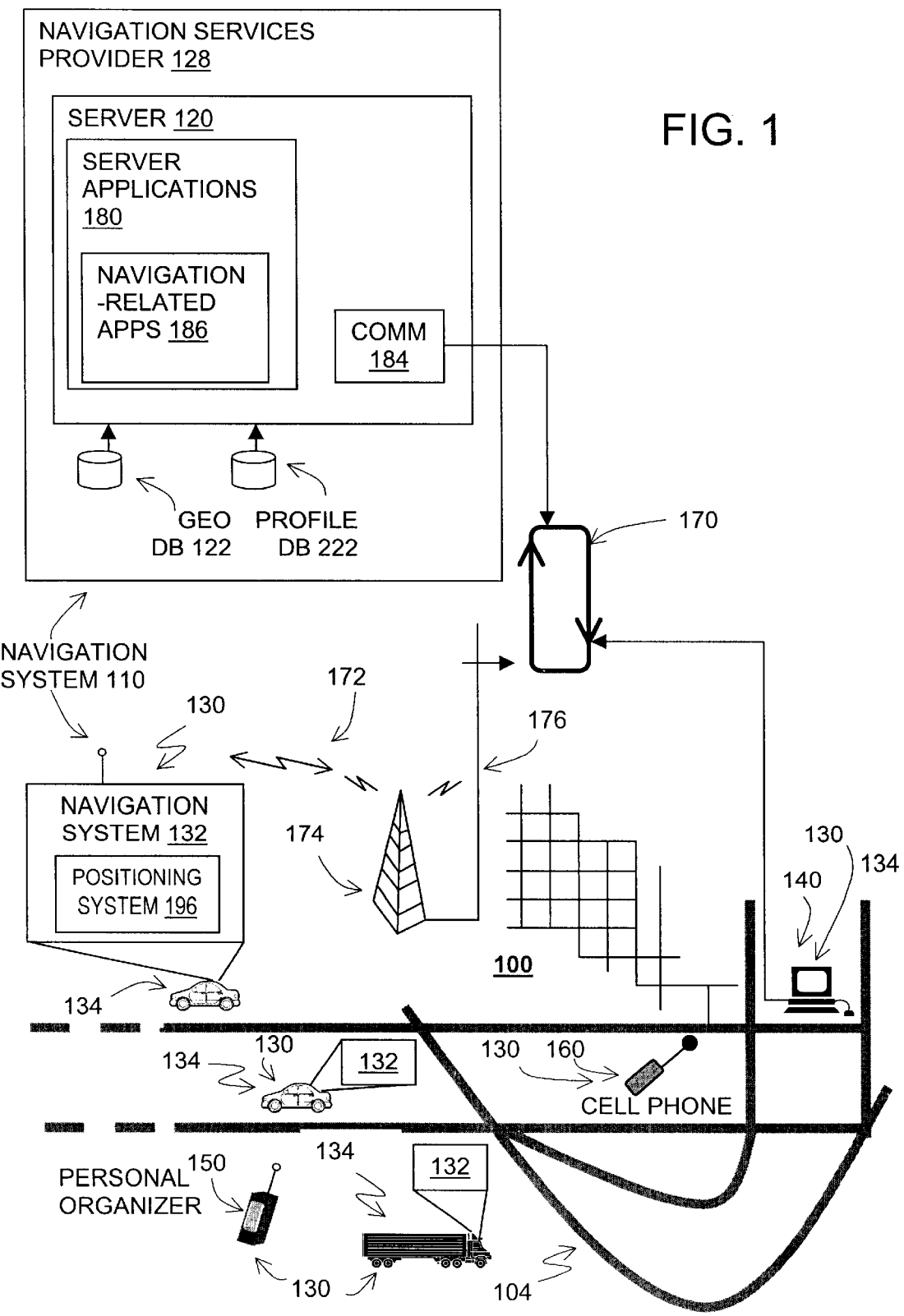
FIG. 1 is an illustration of a navigation system according to a first embodiment.

FIG. 1 shows a geographic region 100. The geographic region 100 may correspond to a metropolitan or rural area, a state, a country, or combinations thereof, or any other area of comparable size. Located in the geographic region 100 is a road network 104.

A navigation system 110 serves end users (e.g., vehicle drivers and passengers, as well as other persons) in the geographic region 100. The navigation system 110 is used by the end users to obtain navigation-related services (including map-related services) with respect to the geographic region 100. The navigation-related services include information about travel along the road network 104, including route calculation and guidance, people and business finding services (e.g., electronic yellow and white pages), maps, point of interest searching, destination selection, and so on.

The navigation system 110 is a combination of hardware, software and data. The navigation system 110 includes remote components (i.e., hardware, software or data located at a central location remote from the end users) and local components (i.e., hardware, software, or data located physically with each end user).

Included among the remote components of the navigation system 110 is a navigation services server 120. The navigation services server 120 includes appropriate computer hardware and software to run network applications. Associated with the navigation services server 120 is a geographic database 122. The navigation services server 120 and the geographic database 122 are maintained and operated by a navigation services provider 128.

The local components of the navigation system 110 include the various computer platforms 130 operated by the end users to request and obtain navigation-related and map-related features and geographic data from the navigation services provider 128. These various computer platforms 130 (also referred to as "end user computing platforms" or "client computing platforms") may include navigation system units 132 located in vehicles 134, personal computers 140, personal organizers (e.g., PDAs, PalmPilot®-type devices) 150, wireless phones 160, or any other types of computing devices that have the appropriate hardware and software to access the navigation services provider 128 over a data network 170.

The data network 170 may use any suitable technology and/or protocols that are currently available, as well as technology and/or protocols that become available in the future. For example, the data network may use WAP, TCP/IP, etc. More than one protocol may be used in the data network 170 with appropriate conversions. The data network 170 may be part of, or connected to, the Internet.

A portion of the network 170 may include a wireless portion 172. The wireless portion 172 of the data network 170 enables two-way communication between the mobile end user computing platforms 130 and the service provider 128. The wireless portion 172 may be implemented by any suitable form of wireless communication, including cellular, PCS, satellite, FM, radio, or technologies that may be developed in the future. The wireless portion 172 may include one or more transmitters 174, such as a transponder tower, an antenna tower, an FM tower, satellites, or other suitable means. The transmitters 174 include an appropriate communication link 176 to the network 170 and/or service provider 128. This link 176 may be land-based or may be wireless. The transmitters 174 include suitable technology that enables two-way communication between the service provider 128 and the mobile end user computing platforms 130.

The navigation system 110 of FIG. 1 can accommodate different types of end user computing platforms 130. The navigation system 110 of FIG. 1 allows end users who have different types of computing platforms 130 to obtain navigation services from the navigation services provider 128 and to obtain and use geographic data provided from the navigation services provider 128.

Figure 2:
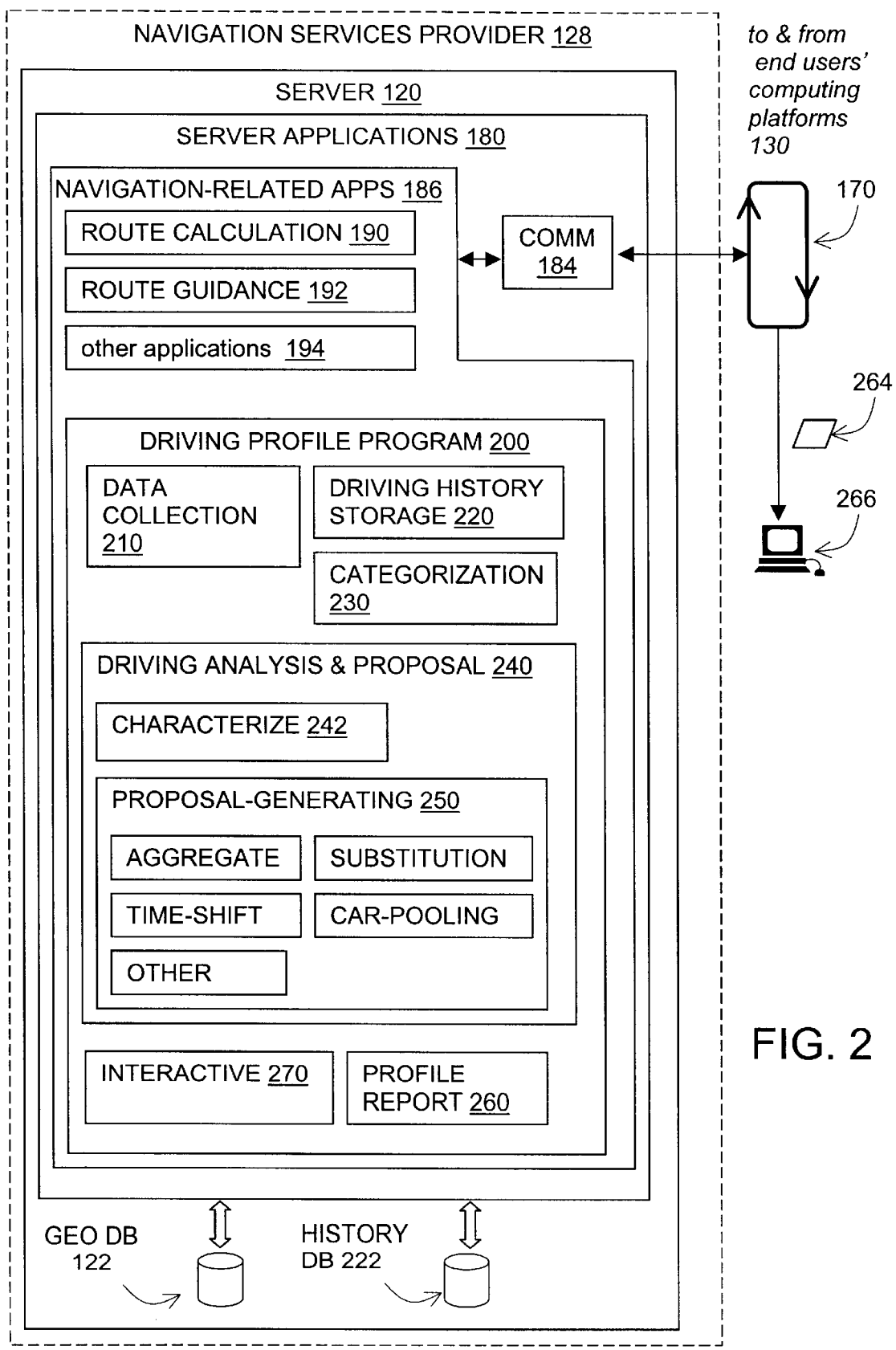
FIG. 2 is a block diagram showing components of the navigation services server of FIG. 1.

Referring to FIGS. 1 and 2, server applications 180 are included on the navigation services server 120 of the navigation services provider 128. The server applications 180 may be stored on one or more hard drive(s) or other media operated by the server 120 and loaded into a memory of the server 120 to run. One of the server applications 180 is a communications application 184. The communications application 184 interfaces with the data network 170 in order to receive messages from and send messages to the end users.

Included among the server applications 180 are navigation-related applications 186. The navigation-related applications 186 use the geographic database 122 associated with the navigation services server 120 in order to provide the various different types of navigation-related services. One of the navigation-related applications 186 is a route calculation application 190. End users may access the navigation services provider to use the route calculation application 190. Given data that identify the positions of an origin and destination, the route calculation application 190 calculates a route between the origin and the destination. The route calculation application 190 may use any of various means or algorithms for this purpose. Methods for calculating routes are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

Another of the navigation applications on the server 120 is a route guidance application 192. The route guidance application 192 uses the output from the route calculation application 190 to provide instructions for the end user to travel to the desired destination. Methods for providing route guidance using geographic data are disclosed in U.S. Pat. No. 6,199,013, the entire disclosure of which is incorporated herein by reference.

Referring to the embodiment of FIG. 1, some of the end user computing platforms 130 include positioning equipment 196. The positioning equipment 196 may include a GPS system, inertial sensors, wheel pulse sensors, etc. Using this positioning equipment 196, the position of the end user's computing platform 130 can be determined. Methods for determining position are disclosed in U.S. Pat. No. 6,192,312, the entire disclosure of which is incorporated by reference herein.

Using data that indicate the end user's positions, the route guidance application (192 in FIG. 2) on the navigation services server 120 may determine the appropriate times and locations at which to provide maneuvering instructions.

In order to provide navigation-related features, the navigation-related applications 186 use data from the geographic database 122. The geographic database 122 includes data that represent the roads and intersections in the geographic region 100 and also includes information relating to the represented roads and intersections, such as turn restrictions at intersections, speed limits along the roads, street names of the various roads, address ranges along the roads, and so on. The geographic database 122 also contains information about points of interest, businesses and other information. The geographic database 122 may be organized to facilitate performing navigation-related functions. Methods of organizing a geographic database to enhance the performance of certain navigation-related functions are described in U.S. Pat. Nos. 5,974,419, 5,968,109 and 5,953,722 the entire disclosures of which are incorporated by reference herein.

II. Driving Profile Program

Referring to FIGS. 1 and 2, the navigation services provider 128 operates a driving profile program 200. In this embodiment, the driving profile program 200 is installed on the navigation services server 120. The driving profile program 200 is a software application that runs on the navigation services server 120. According to this embodiment, the driving profile program 200 monitors each end user's driving activity and stores data about each end user's driving activity. Then, the driving profile program 200 analyzes each end user's driving activity over a period of time. Then, the driving profile program 200 provides the end user with a report describing the end user's driving activity. According to one embodiment, the driving profile program 200 determines ways that the end user can save time (or expense) by modifying his/her driving activity. The driving profile program 200 provides the end user with suggestions how the end user can modify his/her driving activity to save time or expense.

FIG. 2 shows components of the driving profile program 200. The driving profile program 200 includes a data collection component 210. The data collection component 210 monitors some or all of the trips that end users make. The data collection component 210 receives information about each end user's driving activity from the other navigation-related applications, such as the route calculation application 190 and the route guidance application 192. The data collection component 210 may also receive data directly or indirectly from the end users' positioning equipment.

The end users whose trips are monitored by the data collection component 210 may include all the end users that use the navigation services provider 128. Alternatively, the end users whose trips are monitored may include only those end users that sign up for the driving profile service.

The driving profile program 200 includes a driving history storage component 220. The driving history storage component 220 receives data from the data collection component 210. The driving history storage component 220 stores data about each end user's driving activity in a driver history database 222.

Figure 3:
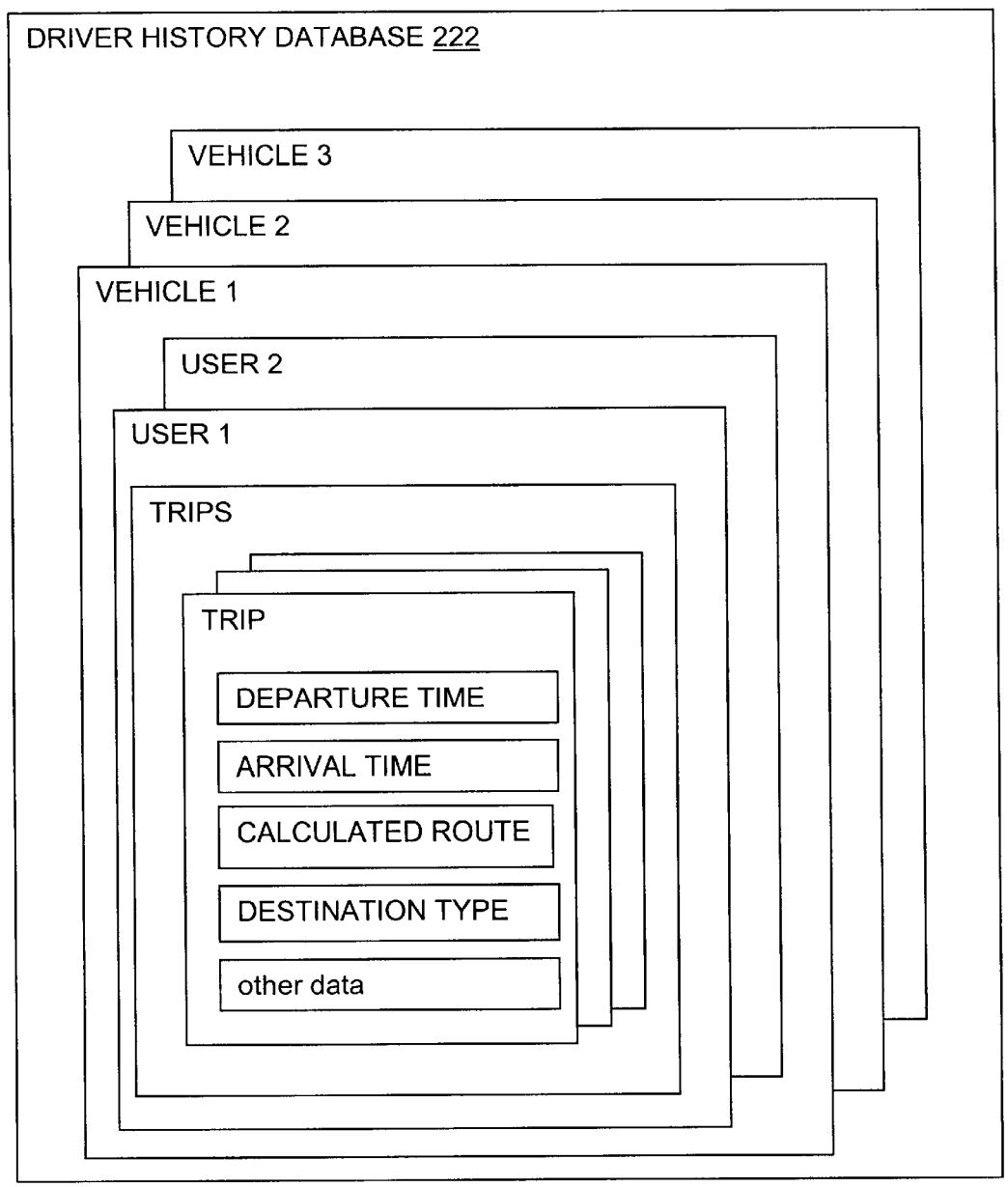
FIG. 3 is a block diagram showing some of the kinds of data that are stored by the driving profile program of FIG. 2.

Some of the kinds of data that the driving history storage component 220 stores are shown in FIG. 3. As shown in FIG. 3, the kinds of data that are stored by the driving history storage component 220 include (1) data identifying the vehicle, (2) data identifying the user (in case a vehicle is driven by more than one driver), and (3) data relating to trips. The data relating to trips include (1) data indicating the departure time (including hour, minute, day, etc.), (2) data indicating the destination arrival time (including hour, minute, day, etc.), and (3) data indicating whether the end user was following a calculated route to the destination.

The driving history storage component 220 also stores data indicating the type of destination that was visited and/or stops along the way. When storing information about destinations and/or stops along the way, an attempt is made to identify the destination or stop by type, e.g., home, work, church, grocery store, gas station, ATM, restaurant, mall, video store, auto maintenance, library, etc.

Referring again to FIG. 2, in order to store data indicating the type of location visited, the driving history storage component 220 may use a categorization function 230. The categorization function 230 analyzes the trips that an end user makes in order to classify the destinations of the trips into categories based on type.

The categorization function 230 obtains information from several sources. One source from which the categorization function 230 obtains information is the route calculation application 190 on the navigation server 120. If an end user was following a calculated route to a destination and the destination was a known type of point of interest (e.g., a restaurant), then the categorization function 230 identifies the destination type of the trip as "restaurant" and stores data indicating "restaurant" in the driver history database 222. The categorization function 230 may also store additional data about the type of restaurant visited (e.g. Italian, Chinese, etc.) or the restaurant chain (e.g., McDonalds), if applicable.

The categorization function 230 can identify the type of a destination to which an end user travels even if the end user has not requested that a route be calculated to the destination. For example, if the end user travels to a grocery store and parks in a parking lot of the grocery store, the categorization function 230 can determine that the end user has driven to a grocery store by matching the location where the end user parked his/her vehicle to the location of the parking lot of the grocery store. The categorization function 230 obtains data indicating the location of the grocery store from the geographic database 122. The categorization function 230 obtains data indicating the location where the end user parked his/her vehicle from the positioning equipment 196 located in the end user's navigation system.

The categorization function 230 can also identify destinations to which an end user travels by reference to a list of stored personal destinations. According to this embodiment, the navigation system 110 allows each end user to store a number of personal destinations. These destinations may include the end user's home, place of businesses, homes of relatives, or other destinations. The list of personal destinations identifies the location of each destination, e.g., by address, name, coordinates, road segment, etc. The list of personal destinations may be stored on the navigation server 120 or locally on the end user's computing platform 130.

The categorization function 230 uses an end user's list of personal destinations to determine whether the end user has made a trip to any of these destinations.

The categorization function 230 can also identify destinations to which an end user travels by using the end user's input, e.g., querying the end user.

The types of data shown in FIG. 3 are only some of the kinds of information that are stored by the driving history storage component 220 of the driving profile program 200. In alternative embodiments, the driving history storage component 220 may store additional or other kinds of information. For example, counts of the number of trips to each destination can be stored (e.g., 100 trips to work over a three month period). Average travel times may be calculated and stored.

Referring to FIG. 2, the driving profile program 200 includes a driving activity analysis and proposal component 240. The driving activity analysis and proposal component 240 receives data from the driving history storage component 230. The driving activity analysis and proposal component 240 analyzes the driving activity of each end user.

The driving analysis and proposal component 240 includes several functions. The driving analysis and proposal component 240 includes a characterization function 242. The characterization function 242 attempts to identify which trips a user makes are recurring and which are non-recurring. The characterization function 242 also attempts to identify which trips that a user makes are required and which are optional. The characterization function 242 also attempts to identify flexible and inflexible time constraints for different kinds of trips. For example, a trip to work may be categorized as a required trip, whereas a trip to the grocery store may be categorized as optional. A trip to a church service may be categorized as a required trip with an inflexible time constraint. A trip to a cinema may be categorized as an optional trip with a flexible time constraint.

After categorizing the trips made by a user, the driving analysis and proposal component 240 identifies proposed changes to the end user's driving activity. The driving analysis and proposal component 240 includes a proposal-generating function 250. The proposal-generating function 250 attempts to identify possible changes that the end user can make in his/her driving activity that would reduce the amount of time or expense incurred by the end user while fulfilling the purposes for which the end user makes the trips.

The proposal-generating function 250 performs an analysis of an end user's driving activity after an initial period of time has elapsed during which the end user's driving activity has been monitored by the data collection component 210 and data about the driving activity has been stored by the driving history storage component 220. The initial period of time may be configurable. In one embodiment, the initial period of time is one month. In alternative embodiments, the initial period of time may be less than a month or longer than a month. After the initial period of time has passed, the proposal-generating function 250 may be operated at any time. The proposal-generating function 250 may be operated as frequently as desired.

The proposal-generating function 250 performs several kinds of analysis. Some or all these types of analysis may be performed by default. Alternatively, the proposal-generating function 250 may be configured by the end user so that only some of the different types of analysis are performed.

One type of analysis performed by the proposal-generating function 250 is trip aggregation. The trip aggregation analysis examines the trips made by the end user over a period of time. The proposal-generating function 250 may develop a proposal to combine certain trips.

Another type of analysis performed by the proposal-generating function 250 is time-shifting. The time-shifting analysis examines the times that the end user travels to destinations and compares these time to historical data on traffic congestion. Using the time-shift analysis, the proposal-generating function 250 may develop a proposal to change the times at which certain trips are taken.

Another type of analysis performed by the proposal-generating function 250 is substitution. The substitution analysis examines the destinations to which the end user travels to determine whether other destinations of the same type may be more convenient. Using the substitution analysis, the proposal-generating function 250 may develop a proposal to substitute one destination of a given type for another destination of the same type.

Another type of analysis performed by the proposal-generating function 250 is car-pooling. The car-pooling analysis examines the times that the end user travels to certain destinations and compares these times and destinations to the times and destinations of other users who are conveniently located to the user. Using the car-pooling analysis, the proposal-generating function 250 may develop a proposal to car-pool with other drivers for certain trips.

These are only some of the types of analysis that the proposal-generating function 250 performs. Any type of analysis that examines an end user's driving activity over time and determines ways to save the end user time or expense may be used.

The driving profile program 200 includes a profile report component 260. The profile report component 260 provides the end user with a report 264 that includes a profile of his/her driving activity over a period of time. In preparing the report 264, the profile report component 260 receives data from the driving history storage component 230 and the categorization function 230. The report 264 may indicate the amounts of time that the end user spends traveling to certain types of destinations. The report may also indicate the percentages of time spent traveling to each of the different types of destinations. The report may include other information. For example, the report may include a "time wastage factor." The "time wastage factor" is an indication of how much time the driver spends unnecessarily driving, making unnecessary stops, etc.

The report 264 may be obtained by the end user via his/her navigation platform 130. Alternatively, the end user may obtain the report 264 via a personal computer 266 via the data network 170.

According to the embodiment of FIG. 2, the report 264 provided to the end user also includes suggestions about how the end user can save time and/or expense by modifying his/her driving activity. In preparing the suggestions, the profile report component 260 uses data from the proposal-generating component 250.

According to a further aspect of the embodiment of FIG. 2, the driving profile program 200 also includes an interactive feature 270. The interactive feature 270 operates in conjunction with the profile report component 260. The interactive feature 270 allows an end user who has received a profile report 264 to propose his/her own driving activity modifications and receive estimates from the driving profile program 200 of the effects such user-suggested modifications would have on the time and expense of the end user's driving activity. This allows an end user to try out virtual schedules to see how they compare to his/her existing schedule and the suggestions of the driving profile program. The interactive feature 270 also allows an end user to see the estimated effects of following only some of the suggestions made by the driving profile program. Once the end user decides to take any of the suggestions of the driving profile program, a schedule can be downloaded into the end user's computing platform, personal digital assistant, navigation system, etc.

EXAMPLE 1

The driving profile program identifies the number of trips made by a user to the same destinations. For example, the driving profile program identifies that the end user makes on average 12 trips to the grocery store every month with each trip taking 1½ hours including 20 minutes of driving time. The driving profile program reports the number of trips (e.g., 12), the amount of time (18 hours), the driving time (4 hours) and the percentage of time this represents out of the total time that the end user spends driving each month (e.g., 10%). The driving profile program then make suggestions how the end user can save time. This may include making fewer trips, stopping at the grocery store on the way home from work, or using an on-line grocery service. Each of these alternatives is presented with the amount of time that could be saved.

For example, if an end user could reduce the number of trips by ⅓, an estimated 6 hours a month could be saved. On the other hand, if the end user could use an on-line service for ⅔ of the trips, an estimated 10 hours a month could be saved. When these alternatives are presented to the end user in this manner, it may be an easy choice for the end user to change a driving pattern.

EXAMPLE 2

The driving profile program identifies that the end user leaves for work at 700 AM each day and returns at 530 PM. Based on an analysis of historical traffic conditions, the driving profile program finds that if the end user left 15 minutes later, he/she would spend on average of 10 minutes less time driving to and from work each day. This would add up to almost 4 hours a month. The driving profile program would suggest that the end user leave 15 minutes later for work.

EXAMPLE 3

The driving profile program identifies that an end user takes a child to soccer practice every Wednesday at 400 PM. The driving profile program identifies that a person on the next street drives his/her child to ballet class at the same times. The driving profile program suggests a car pool arrangement.

EXAMPLE 4

The driving profile program might suggest that one destination be swapped for another. For instance, perhaps the video store or the drugstore that the end user visits is not as convenient as one that the end user passes on the way to work. Users may tend to use stores nearest their homes, rather than the ones that they pass driving to work each day.

EXAMPLE 5

According to another example, a shopping list is transferred from an end user's personal digital assistant to his/her navigation system. Based on the information from the shopping list, the navigation system recommends the most convenient store from which to purchase the items on the list.

EXAMPLE 6

There is an opportunity for targeted advertising based on the personal information collected about users. For example, if an end user goes to a bowling alley once a week, other bowling alleys in town may want the end user's business. Also, the restaurant next to the bowling alley (that the end user currently visits) may want the end user's business. These vendors may send the end user advertising messages. The driving profile program may ask an end user whether he/she would like to receive targeted advertising, and if so, send these types of messages to the end user.

III. Alternatives
A. Alternative Navigation System Architectures

In the embodiments described above, a navigation system architecture was described that included end user computing platforms distributed throughout a geographic region that accessed a remotely located navigation services provider. This is only one type of architecture upon which embodiments of the present invention can be implemented. For example, the driving profile program can be implemented on standalone navigation systems that are not connected to a remotely located server. The driving profile program can also be implemented on hybrid systems that use some geographic data stored locally as well as other geographic data stored remotely.

In these other types of navigation systems, the driving profile program functions in a similar manner. For example, in a standalone navigation system, data about the end user's driving activity are stored locally in the end user's navigation system. After a period of time, a report is provided to the end user about his/her driving activity. Suggestions about timesaving modifications may also be provided. These suggestions may not take into account traffic conditions or the activities of other drivers if data about these are not available.

According to an alternative, driving history data may be transmitted from a standalone navigation system to a remotely located navigation services provider for use in the driving profile program. According to another alternative, traffic data and data about other drivers may be transmitted to the standalone navigation system.

According to still another embodiment, the driving profile program may be implemented without a navigation server. Instead, the end users' computing platforms may operate the driving profile program as a peer-to-peer system. According to this alternative, the end user computing platforms exchange information with each other about traffic conditions and/or each other's driving activity.

In another alternative embodiment, the driving profile program may be implemented as an application on a personal computer. According to this alternative, the end user may enter data about his/her driving activity from his/her own personal recollection or notes. Alternatively, the end user's navigation system may store data about the end user's driving activity and then these data can be transferred from the data storage of the navigation system to the end user's personal computer. The data about the end user's driving activity may also be stored on a personal digital assistant.

B. Other Alternatives

According to another alternative, the report generated by the driving profile program could show general navigation system usage. For example, out of total miles driven during a month, the report would show the percentage of the time that the navigation system had been turned on or used. Additional information that can be collected include the percentage of the time that a destination has been used and the percentage of destinations that are or are not in the database.

Fuel usage might also be a part of the report.

In some of the embodiments described above, the driving profile program provided an end user with a report that described the end user's driving activity over a period of time and provided the end user with suggestions about modifying his/her driving activity in order to save time and/or expense. In an alternative embodiment, an end user may choose to receive a report that only describes his/her driving activity over a period of time without including any suggestions about possible modifications of the end user's driving activity. The information about the end user's driving activity over a period of time is valuable by itself and the end user may use this information to change his/her driving activities on his/her own. Alternatively, an end user may choose to receive a report that does not include a description of his/her driving activity over a period of time but instead only includes suggested possible modifications of his/her driving activity.

IV. Advantages

The driving profile program provides advantages beyond those available with prior navigation systems. With the driving profile program, an end user is provided with information that may make many trips unnecessary.

It is intended that the foregoing detailed description be regarded as illustrative rather than limiting and that it is understood that the following claims including all equivalents are intended to define the scope of the invention.

We claim:

1. A method of operation of a navigation system comprising:
   monitoring trips made over a period of time by an end user with a motor vehicle;
   storing data that represent said trips made by the end user with the motor vehicle, wherein said data indicate destinations of said trips and purposes associated with said trips;
   analyzing said data that represent the trips;
   determining ways to reduce an amount of travel time spent on future trips to be made by the end user to accomplish said purposes; and
   reporting said ways to the end user.

2. The method of claim 1 wherein said monitoring is performed using data derived from positioning equipment located in the motor vehicle.

3. The method of claim 1 wherein said period of time is at least one month.

4. The method of claim 1 wherein said period of time is several months.

5. The method of claim 1 wherein said ways include reducing a number of trips made to the same destination.

6. The method of claim 1 wherein said ways include changing a time at which a trip to a destination is begun.

7. The method of claim 1 wherein said ways include combining separate trips.

8. The method of claim 1 wherein said ways include car-pooling with another end user.

9. The method of claim 1 wherein said ways include substituting a destination of a given type for a different destination of the same type.

10. The method of claim 1 wherein said ways include substituting online purchases for trips to a certain destination.

11. The method of claim 1 further comprising:

presenting the end user with an interactive interface through which driving activity modifications can be suggested by the end user; and providing the end user with an estimate of how the driving activity modifications suggested by the end user would affect the amount of time spent on future trips to be made by the end user.

12. The method of claim 1 wherein said steps of storing, analyzing, and determining are performed on a navigation server located remotely from a computing platform operated by the end user.

13. The method of claim 1 wherein the navigation system is a standalone navigation system and wherein said steps of storing, analyzing, and determining are performed on the standalone navigation system.

14. The method of claim 1 wherein said step of determining takes into account traffic conditions at different times of day.

15. The method of claim 1 wherein said step of determining takes into account driving activity of other end users.

16. The method of claim 1 further comprising:

including advertising when reporting said ways to the end user.

17. The method of claim 1 wherein said purposes associated with said trips are determined by obtaining information from a route calculation application.

18. The method of claim 1 wherein said purposes associated with said trips are determined by matching a location at which the end user stops said motor vehicle to a location of a business.

19. The method of claim 18 wherein said location of said business is obtained from a geographic database.

20. The method of claim 18 wherein said location at which the end user stops said motor vehicle is obtained from positioning equipment located in the motor vehicle.

21. The method of claim 1 further comprising:

reporting to the end user how much time is wasted on unnecessary trips.

22. A method of operation of a navigation system comprising:

using a navigation system to monitor trips made over a period of time by an end user with a motor vehicle;

storing data that represent said trips made by the end user with the motor vehicle, wherein said data include destinations of said trips and purposes associated with said trips;

analyzing said data that represent the trips;

determining an amount of time spent on unnecessary trips made by the end user; and reporting about said unnecessary trips to the end user.

23. The method of claim 22 wherein said period of time is at least one month.

24. The method of claim 22 wherein said period of time is several months.

25. The method of claim 22 further comprising:

presenting the end user with an interactive interface through which driving activity modifications can be suggested by the end user; and providing the end user with an estimate of how the driving activity modifications suggested by the end user would affect an amount of time spent on future trips to be made by the end user.

26. The method of claim 22 wherein said steps of storing, analyzing, and determining are performed on a navigation server located remotely from a computing platform operated by the end user.

27. The method of claim 22 wherein the navigation system is a standalone navigation system and wherein said steps of storing, analyzing, and determining are performed on the standalone navigation system.

28. The method of claim 22 wherein said step of determining takes into account traffic conditions at different times of day.

29. The method of claim 22 wherein said step of determining takes into account the driving activity of other end users.

30. The method of claim 22 further comprising:

including advertising when reporting to the end user.

31. The method of claim 22 wherein said purposes associated with said trips are determined by obtaining information from a route calculation application.

32. The method of claim 22 wherein said purposes associated with said trips are determined by matching a location at which the end user stops said motor vehicle to a location of a business.

33. The method of claim 32 wherein said location of said business is obtained from a geographic database.

34. The method of claim 32 wherein said location at which the end user stops said motor vehicle is obtained from positioning equipment located in the motor vehicle.

35. A driving profile program stored on a computer-readable media comprising:

a data collection component that obtains data about the driving activities of each of a plurality of end users;

a driving history storage component that stores the data about the driving activities of the plurality of end users;

a driving analysis component that analyzes the data about the driving activity of each end user and determines time saving modifications; and a reporting component that provides each end user with a report indicating the time saving modifications determined for the end user.

36. The driving profile program of claim 35 further comprising:

an interactive component by which each end user can propose modifications to an associated driving activity profile and receive estimates of how the modifications would affect the time spent traveling to destinations.

* * * * *